3,091,605
OLEFIN POLYMERIZATION CATALYST PRETREATMENT

David C. Hull, Hugh J. Hagemeyer, Jr., and Marvin B. Edwards, Longview, Tex., assignors to Eastman Kodak Company, Rochester, N.Y., a corporation of New Jersey
No Drawing. Filed Jan. 18, 1960, Ser. No. 2,870
6 Claims. (Cl. 260—93.7)

This invention relates to an improved process for the polymerization of α-olefins to form polymers. In particular, this invention relates to an improved catalyst for the low pressure polymerization of α-olefins to solid polymers. In a specific aspect this invention relates to an improved method of conditioning olefin polymerization catalysts containing an oxide of a metal of Group 5a or 6a (left-hand sub-group of Groups 5 and 6) of the Mendeleef Periodic Table, namely, one or more of the oxides of vanadium, niobium, tantalum, chromium, molybdenum, tungsten or uranium.

It has been shown that α-olefins such as ethylene or propylene could be catalytically polymerized with certain specific catalyst combinations to give high molecular weight polyolefins having unusually high crystallinity and density. One general type of catalytic process which has received considerable attention involves the use of certain specific metal oxides, preferably spread on a solid support, in polymerizing the gaseous olefins to solid polymer. Metal oxides of the fifth and sixth sub-groups of the Periodic Table are known to function as low pressure polymerization catalysts in such a method whereby a high density polyolefin can be prepared. The metal oxide is usually impregnated on a suitable support such as gamma alumina, silica gel, silica-alumina mixtures or other suitable supporting substances. Typical of the catalysts used are 10% molybdenum oxide on gamma alumina, 1–10% chromium oxide on 90–10 silica alumina, and 1–10% vanadium oxide on gamma alumina. These catalysts are usually activated by reducing to an average valence somewhere below their maximum valency. The reduction can be carried out in the presence of hydrogen, carbon monoxide, mixtures thereof or other suitable reducing gas mixtures. It is also possible to produce active catalysts by the straight thermal reduction of the metal oxides in the presence of air. Promoters, for example, the alkali metals, the alkali metal alkyls, aluminum alkyls and alkyl aluminum halides are often employed with the above metal oxide catalysts. In general, metals, metal alkyls, metal hydrides, alkyl metal halides and combinations thereof have been found useful as promoters with the metal oxide catalyst systems.

Prior art workers have appreciated the fact that the above catalysts systems are particularly susceptible to poisoning by water and oxygen-containing compounds such as carbon dioxide, sodium hydroxide, ketones and alcohols. For example, it was discovered that in the polymerization of olefins in the presence of catalysts containing subhexavalent molybdenum-oxygen compounds, oxygen and water exert undesirable effects, namely, markedly reducing the yield of desired polymer, substantially reducing the life of the polymerization catalyst and, in certain instances greatly reducing the specific viscosity of the desired polymeric product. Therefore, it was suggested that substantially deoxygenated and dehydrated olefinic charging stocks, and hydrocarbon reaction mediums be used in an α-olefin polymerization process employing such catalysts. However, such suggestions have not been completely satisfactory.

Accordingly, it is an object of this invention to provide a process for the polymerization of α-olefinic hydrocarbons such as ethylene and propylene in the presence of catalysts containing an oxide of a metal of Group 5a or 6a of the Mendeleef Periodic Table in which the undesirable effects of oxygen and water are substantially eliminated.

It is another object of this invention to increase the activity of a catalyst comprising an oxide of a 5a or 6a metal.

It is a further object of this invention to provide an improved method of conditioning catalysts selected from metal oxides from the fifth and sixth sub-groups of the Periodic Table to provide higher polymerization rates, greater yields of polymer per unit of catalyst and polymers with improved color and lower residual ash content.

A further object of this invention is to provide a polymerization process employing a conditioned metal oxide catalyst of a metal of the fifth or sixth sub-groups of the Periodic Table.

Other objects will become obvious from the description and claims which follow.

In a continued study of polymerization processes employing metal oxide catalysts, for example, molybdenum oxide on gamma alumina, we have discovered that catalysts which had been reduced with hydrogen to an average valence in the range of 2 to 5 reacted with the reaction solvent at the temperatures employed for polymerization to produce water and the resulting equivalents of oxygenated compounds in the reaction solvent. Following this discovery, we found that oxides of metals such as vanadium and chromium that had been previously reduced were also still capable of reaction with the solvents employed in the polymerization reaction and, although the degree of reaction of the reduced metal oxide with the solvent is slight, the effect of the impurities thus formed is exceedingly great.

In accordance with this invention therefore, we have provided an improved catalyst for the low pressure polymerization of an α-olefin by slurrying a reduced oxide of a Group 5a or 6a metal of the Periodic Table in a solvent suitable for the polymerization of such α-olefins, heating said slurry to a temperature within the conventional polymerization range of about 200 to about 300° C. and removing water which forms. This conditioned catalyst can then be reslurried in a suitable reaction solvent, preferably the same as the one employed in the conditioning procedure, and employed in the polymerization.

The conditioned catalyst of our invention exerts an unexpected and pronounced effect upon the rate of α-olefin polymerization. For example, reaction rates in the case of the molybdenum oxide on gamma alumina catalysts promoted with sodium can be increased from a value of less than two grams per gram of catalyst per hour to reaction rates in the range of 10–15 grams of polymer per gram of catalyst per hour. Furthermore, by eliminating the formation of oxygenated compounds in the reaction solvent the color formed during the reaction and retained in the polymer has been greatly reduced. In addition, the yield of polymer per unit of catalyst has been increased from an average of 20–30 pounds per pound of catalyst to as much as 200 pounds of polymer per pound of catalyst.

Conditioning of the catalyst according to our invention also results in the elimination of soluble ash which previously could not be filtered out of the polymer solution. Previously, the oxidized solvent reacted with the alkali metal promoter to form organo metallic compounds which were soluble in the hydrocarbon solvent and passed through filters to remain with the polymer to give products with poor color, high ash content, and exceedingly poor weathering properties.

It has also been found that conditioning the catalyst in accordance with our invention has provided a catalyst of uniformly high activity, whereas prior art catalysts reduced with hydrogen to the same average valence varied widely in activity. The effect of leveling out these differences is a smoother operation of the polymerization system.

It has further been found that in the sodium promoted molybdena catalyst in which molybdenum trioxide has been partially reduced with hydrogen, it is important to cool the reduced catalyst in a dry hydrogen stream in order to effect the highest possible concentration of absorbed hydrogen on the reduced catalyst. Although the exact nature in which the hydrogen enters into the formation of active catalyst is not known, it presumably facilitates the formation of an active complex between alkali metal and the partially reduced molybdenum oxide.

The metal oxides of the fifth and sixth sub-groups of the Periodic Table can be charged to the reaction vessel as an unreduced catalyst together with suitable promoters such as sodium, metal alkyls, metal hydrides and alkyl metal halides of Groups 1 to 3 of the Periodic Table and initiate polymerization without further treatment. However, this is not a preferred method since, in general, the water formed in reducing the catalyst to an active form consumes the promoter and the by-product oxides and hydroxides formed are catalyst poisons. Much more effective utilization of the promoters is obtained when the catalyst is prereduced before charging to the reactor. The reducing action is usually carried out at temperatures in the range of 400–700° C. for a period of time sufficient to reduce the oxide to the desired valence. The preferred reduction temperature for the molybdenum oxide on gamma alumina is about 480° C. for 10 hours which generally leads to an average valence of 4.2 to 4.8. The catalyst is then cooled in a stream of dry hydrogen and subsequently slurried in the reaction solvent with the promoter.

In the practice of our invention, the catalyst is slurried in reaction solvent and this slurry is heated in the temperature range of about 200–300° C. and water is removed, e.g., by distillation, until no further water formation is observed. Alternatively, the conditioned catalyst may be removed from the water in the reaction solvent and charged, with fresh solvent, into a suitable polymerization vessel. In the sodium promoted molybdenum oxide on gamma alumina catalyst system the usual temperature of polymerization is in the range of 240–280° C. and accordingly, the preferred range for conditioning this catalyst is in the same temperature range.

The catalyst conditioning treatment can be carried out at normal or autogeneous pressures and the pressure is usually a function of the boiling point of the solvent. With reaction solvent boiling below the temperature at which the polymerization is to be carried out it is naturally necessary to employ pressure or at least autogeneous pressure to achieve the desired reaction temperatures.

Any suitable liquid organic reaction media for α-olefin polymerization can be employed in our conditioning process. Suitable solvents for the process of our invention therefore include the lower paraffins such as propane, isobutane, pentane, hexane, isooctane and highly paraffinic high boiling solvents such as odorless naphtha and mineral spirits. Although the aliphatic and cycloaliphatic solvents are preferred in our process, it is also possible to use the aromatic and alkyl aromatic compounds. In every case, we have found that there is a reaction between solvent and catalyst at polymerization temperatures to produce water.

The invention can be employed for conditioning catalysts which are used in polymerizing any of the α-olefins, and particularly those containing 2–10 carbon atoms such as 1-pentene, 1-hexene, 1-decene, styrene and the like, and especially ethylene, propylene and mixtures thereof.

The effect of conditioning a metal oxide catalyst according to the process of our invention is illustrated by the following tables. Tables 1 and 2 list the results obtained when a catalyst, as hereinafter described, is treated with 2000 ml. of reaction solvent at their atmospheric boiling points and at 250° C. and autogenous pressure respectively. The catalyst is obtained by reducing 50 pounds of a catalyst comprising 100 mesh 10% molybdenum trioxide on gamma alumina at 450° C. in a gas fired ball mill with dried hydrogen. At the end of four hours the average valence of the molybdenum was 4.42. The catalyst was cooled to 75° C. in dry hydrogen and then slurried in odorless mineral spirits with a boiling range of 190–210° C.

TABLE 1

| Solvent | $H_2O$ Formed, ml. | Final Catalyst Valence |
|---|---|---|
| Odorless mineral spirits | 1.9 | 4.15 |
| Do | 1.8 | 4.10 |
| n-Decane | 0.6 | 4.38 |
| Xylene | 0.4 | 4.26 |

TABLE 2

| Solvent | $H_2O$ Formed, ml. | Final Catalyst Valence |
|---|---|---|
| Odorless mineral spirits | 5.1 | 3.65 |
| n-Decane | 5.3 | 3.80 |
| Xylene | 4.6 | 3.77 |

There has been considerable difficulty in reproducing quantitative results for different batches of reduced catalysts. Evidently, the oxide portion capable of reaction with the solvent varies from batch to batch with slight variations in the hydrogenation conditions. For catalysts reduced to an average valence of 4.2 to 4.8 the quantity of water formed with odorless mineral spirits at 250° C. varies from 2 to 5 ml. for 250 g. of catalyst. The quantity of water formed is independent of the volume of solvent used.

The effect of catalyst conditioning on polymerization rates, yields and polymer properties is shown in the following table. In the first column are the average values for 10 runs using the nonconditioned catalysts as described above. The second column lists the average results for 10 runs made with the same catalysts conditioned by treating with odorless mineral spirits at 250° C. and 50 p.s.i., and distilling out the water until no more was formed. The catalyst was then washed and reslurried in fresh mineral spirits.

TABLE 3

| Runs | 1–10 | 11–20 |
|---|---|---|
| Solvent, lbs | 218 | 218 |
| Catalyst, grams | 445 | 445 |
| Sodium, grams | 60 | 60 |
| Time, hrs | 18 | 18 |
| Temperature, ° C | 257 | 257 |
| Pressure, psig | 450 | 450 |
| Ethylene: | | |
| Average $CO_2$, p.p.m | 17 | 20 |
| Average $H_2O$ p.p.m | 1–2 | 1–2 |
| $H_2O$ in Solvent, p.p.m | <1 | <1 |
| Percent Polymer Discharged | 11.69 | 34.6 |
| Rate, lb. Polymer/lb. Catalyst/hr | 1.64 | 6.23 |
| Yield, lb. Polymer/lb. Catalyst | 29.6 | 110 |
| Filtered Polymer, lbs | 29.0 | 107 |
| Ash, wt. percent | .043 | .003 |
| $Na_2O$ in Ash, wt. percent | 17.3 | 0 |
| Melt Index | 1.38 | 1.25 |
| Melt Stability Index | 0.92 | 0.19 |
| Color | 5 | 2 |

The practice of the invention and certain preferred embodiments is illustrated by the following examples which contrast the results obtained using the conditioned catalyst of our invention and the nonconditioned catalysts of the prior art. It will be understood, however, that the examples are illustrative only and are not intended to limit the scope of the invention unless otherwise specifically indicated.

Example 1

While the process of our invention is of specific importance in the alkali metal promoted molybdenum oxide on gamma alumina catalyst system, because of the extreme poisoning effect of sodium oxide on the polymerization reaction and the resultant color formation due to the presence of this material both in the polymerization reaction and in the ash of the final polymer, our conditioning process also gives improved catalyst activity and yields with a metal alkyl promoted vanadium oxide catalyst and with the unpromoted chromium oxide on silica alumina catalyst systems. Thus, a 10 percent $CrO_3$ on silica-alumina (90–10) catalyst was ground to 100 mesh. The fine powder was then thermally reduced by heating at 650° C. in a gas fired ball mill while passing a mixture containing 95 parts by volume of air and 5 parts by volume of steam through the mill. The catalyst was cooled in a stream of dry air and then slurried in n-decane. The valence of the catalyst was 3.23.

Ten grams of the above catalyst was slurried in 1000 ml. of n-decane and charged to a 2 liter stirred autoclave. The autoclave was purged twice with ethylene and then heated to 175° C. at 1000 p.s.i.g. Make-up ethylene was supplied continuously to maintain the pressure at 1000 p.s.i.g. After 4 hours the autoclave contents were discharged through a plate and frame filter to remove the catalyst. The resulting polymer solution was cooled, filtered and washed with hexane. After drying the yield of polymer was 74.5 grams. Reaction rate was 1.86 grams of polymer per gram of catalyst per hour.

The above polymerization was repeated with 10 grams of the same catalyst which had been conditioned with n-decane at 200° C. After removal of the water formed, the catalyst was washed and reslurried in fresh n-decane. The conditioned catalyst slurry was charged to the autoclave and the polymerization carried out at 175° C. and 1000 p.s.i.g. for 4 hours. The yield of polymer was 212 grams. Reaction rate was 5.31 grams of polyethylene per gram of catalyst per hour.

Example 2

One percent $V_2O_5$ on gamma alumina catalyst was calcined at 500° C. in air for 6 hours. The catalyst was cooled in a stream of dry nitrogen and then slurried in odorless naphtha, boiling range 190–205° C.

Four grams of the vanadia-alumina catalyst and 8 grams of ethyl alumina sesquibromide in 1000 ml. of odorless naphtha were contacted with ethylene at 1000 p.s.i.g. and 180° C. for 14 hours. The yield was 180 grams of polyethylene. Reaction rate was 1.07 grams of polymer per gram of total catalyst per hour.

In a second run employing the same calcined vanadia on alumina catalyst, the catalyst was conditioned with odorless naphtha at 200° C. and the water formed distilled out. After washing and reslurrying, 4 grams of catalyst was charged to the autoclave with 8 grams of ethyl aluminum sesquibromide in 1000 ml. of odorless naphtha. The polymerization was carried out at 180° C. and 1000 p.s.i.g. for 4 hours. 196 grams of polyethylene was obtained. Reaction rate was 4.08 grams of polyethylene per gram of catalyst per hour.

Thus, by means of this invention solid polyethylene and similar polyolefins are readily prepared in high yield in a process which is peculiarly adapted for large-scale commercial manufacture. The polymer obtained is of excellent quality and can be used alone or blended with other olefin polymers obtained by conventional high pressure processes to give any combination of properties desired. The polymers can also be blended with other polymeric materials or can be compounded with the usual pigments, fillers, plasticizers, softeners, coloring agents and the like as desired. The polymers prepared in accordance with this invention can also be processed in substantially the same manner as the polyolefins known in the art heretofore.

Although the invention has been described in detail with particular reference to certain preferred embodiments thereof, it will be understood that variations and modifications can be effected within the spirit and scope of the invention as described hereinabove and as defined in the appended claims.

We claim:

1. A process for producing an improved catalyst for the low pressure polymerization of an $\alpha$-olefin in liquid organic medium which comprises reducing an oxide of a metal selected from the group consisting of Group 5a and Group 6a of the Periodic Table with hydrogen at a temperature in the range of about 400 to about 700° C., slurrying in the absence of hydrogen, said reduced metal oxide in a solvent suitable for the polymerization of said $\alpha$-olefin, heating said slurry to a temperature in the range of about 200 to about 300° C. and distilling off water which forms.

2. A process for producing an improved catalyst for the low pressure polymerization of an $\alpha$-olefin in liquid organic medium which comprises reducing an oxide of a metal selected from the group consisting of Group 5a and Group 6a of the Periodic Table with hydrogen at a temperature in the range of about 400 to about 700° C., cooling said reduced oxide in the presence of hydrogen, slurrying, in the absence of hydrogen, said reduced metal oxide in a solvent suitable for the polymerization of said $\alpha$-olefin, heating said slurry to a temperature in the range of about 200 to about 300° C. and distilling off water which forms.

3. A process for producing an improved catalyst for the low pressure polymerization of an $\alpha$-olefin in liquid organic medium which comprises reducing molybdenum oxide with hydrogen at a temperature in the range of about 400 to about 700° C., slurrying, in the absence of hydrogen, said reduced molybdenum oxide in a solvent suitable for the polymerization of said $\alpha$-olefin, heating said slurry to a temperature in the range of about 200 to about 300° C. and distilling off water which forms.

4. In the polymerization of an $\alpha$-olefin in liquid organic medium by means of a metal oxide catalyst effective to polymerize said $\alpha$-olefin and including a reduced oxide of a metal selected from a group consisting of Group 5a and Group 6a of the Periodic Table, the improvement which comprises, prior to polymerization, effecting reduction of the metal oxide catalyst with hydrogen at a temperature in the range of about 400 to about 700° C., slurrying, in the absence of hydrogen, said reduced metal oxide in a solvent suitable for the polymerization of said $\alpha$-olefin, heating said slurry to a temperature in the range of about 200 to about 300° C. and distilling off water which forms.

5. In the polymerization of an $\alpha$-olefin in liquid organic medium by means of a metal oxide catalyst effective to polymerize said $\alpha$-olefin and including a reduced oxide of a metal selected from the group consisting of Group 5a and Group 6a of the Periodic Table, the improvement which comprises, prior to polymerization, effecting reduction of the metal oxide catalyst with hydrogen at a temperature in the range of about 400 to about 700° C., cooling said reduced oxide in the presence of hydrogen, slurrying, in the absence of hydrogen, said reduced metal oxide in a solvent suitable for the polymerization of said $\alpha$-olefin, heating said slurry to a temperature in the range of about 200 to about 300° C. and distilling off water which forms.

6. In the polymerization of an $\alpha$-olefin in liquid organic medium by means of a molybdenum oxide catalyst effective to polymerize said $\alpha$-olefin, the improvement which comprises, prior to polymerization, effecting reduction of the molybdenum oxide catalyst with hydrogen at a temperature in the range of about 400 to about 700° C., slurrying, in the absence of hydrogen, the reduced molybdenum oxide catalyst in said liquid organic medium, heating said slurry at a temperature in the range of about 200 to about 300° C. and distilling off water which forms.

References Cited in the file of this patent

UNITED STATES PATENTS

| | | |
|---|---|---|
| 2,691,647 | Field et al. | Oct. 12, 1954 |
| 2,731,452 | Field et al. | Jan. 17, 1956 |
| 2,912,419 | Peters et al. | Nov. 10, 1959 |
| 2,963,525 | Folz et al. | Dec. 6, 1960 |